(12) United States Patent
Rhodes et al.

(10) Patent No.: US 7,695,702 B2
(45) Date of Patent: Apr. 13, 2010

(54) OPTIMIZATION OF AMINE REGENERATION SYSTEM START-UP USING FLASH TANK PRESSURIZATION

(75) Inventors: Roy Wade Rhodes, Bryan, TX (US); Quenten Zane Rhodes, II, College Station, TX (US)

(73) Assignee: Newpoint Gas Services, Inc., College Station, TX (US)

( * ) Notice: Subject to any disclaimer, the term of this patent is extended or adjusted under 35 U.S.C. 154(b) by 289 days.

(21) Appl. No.: 11/756,247

(22) Filed: May 31, 2007

(65) Prior Publication Data

US 2007/0286785 A1  Dec. 13, 2007

Related U.S. Application Data

(60) Provisional application No. 60/812,051, filed on Jun. 9, 2006.

(51) Int. Cl.
   *B01D 53/14* (2006.01)
   *B01D 53/18* (2006.01)
   *B01J 38/02* (2006.01)
   *B01J 38/06* (2006.01)
   *B01D 10/00* (2006.01)

(52) U.S. Cl. .......................... 423/228; 502/55; 502/56; 422/187

(58) Field of Classification Search .......... 502/55, 502/56; 423/228; 48/127.3, 127.5; 422/187
See application file for complete search history.

(56) References Cited

U.S. PATENT DOCUMENTS

| | | |
|---|---|---|
| 3,565,573 A | 2/1971 | Thirkell |
| 3,773,895 A | 11/1973 | Thirkell |
| 3,829,521 A | 8/1974 | Green et al. |
| 4,106,916 A | 8/1978 | Tuckett |
| 4,138,230 A * | 2/1979 | Thompson ............. 95/169 |
| 4,152,217 A | 5/1979 | Eisenberg et al. |
| 4,406,868 A | 9/1983 | Carter |
| 4,461,749 A | 7/1984 | Thorn |
| 4,511,381 A | 4/1985 | Mehra |
| 4,798,910 A | 1/1989 | Herrin |
| 5,089,034 A | 2/1992 | Markovs |
| 5,994,147 A | 11/1999 | Rodriguez |
| 6,071,484 A | 6/2000 | Dingman et al. |
| 6,183,540 B1 | 2/2001 | Thonsgaard |

(Continued)

FOREIGN PATENT DOCUMENTS

GB    1096851    12/1967

(Continued)

OTHER PUBLICATIONS

S. Ebenezer, Optimization of Amine Base CO2 Removal Process—Removal of carbon dioxide from natural gas for LNG production, Semester Project Work, Institute of Petroleum Technology, Norwegian University ofScience and Technology, Trondheim, Norway, NTNU Innovation and Creativity, pp. 1-67 (Dec. 2005).

*Primary Examiner*—Timothy C Vanoy
*Assistant Examiner*—Daniel Berns
(74) *Attorney, Agent, or Firm*—McHale & Slavin, P.A.

(57) ABSTRACT

A system for optimizing operation of an amine regeneration system comprising a flash tank, a rich/lean heat exchanger, a still, a reflux condenser, a reflux accumulator, a pump, a reboiler, and a flash tank pressurization assembly.

2 Claims, 2 Drawing Sheets

U.S. PATENT DOCUMENTS

| | | |
|---|---|---|
| 6,531,103 B1 | 3/2003 | Hakka |
| 2002/0007733 A1 | 1/2002 | Morrow |
| 2003/0005823 A1 | 1/2003 | LeBlanc |
| 2004/0060334 A1 | 4/2004 | Palmer |
| 2004/0115109 A1 | 6/2004 | Minkkinen |

FOREIGN PATENT DOCUMENTS

| | | |
|---|---|---|
| WO | WO9707082 | 2/1997 |
| WO | WO2006118795 | 11/2006 |

* cited by examiner

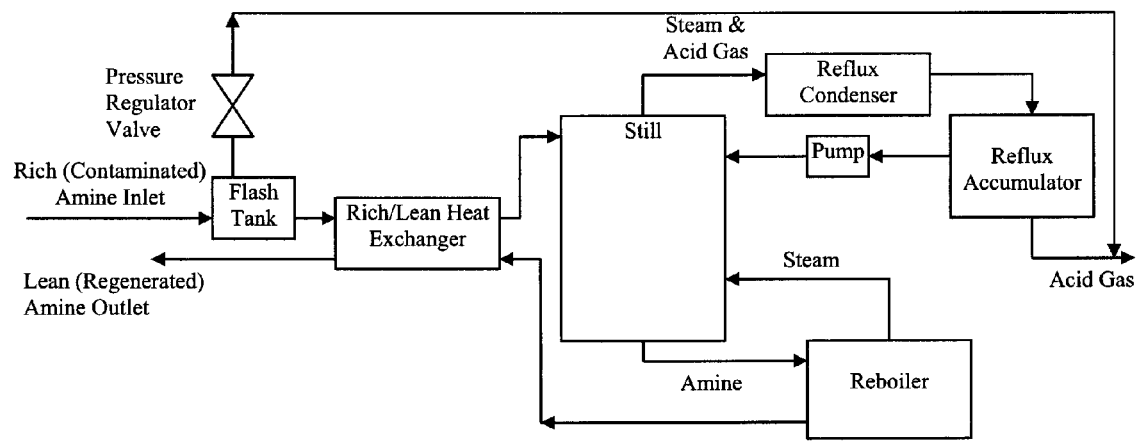
Figure 2 - Prior Art

OPTIMIZATION OF AMINE REGENERATION SYSTEM START-UP USING FLASH TANK PRESSURIZATION

CROSS-REFERENCE TO RELATED APPLICATIONS

This application claims benefit of the filing date of Provisional Patent Application 60/812,051, file Jun. 9, 2006, the contents of which are herein incorporated by reference.

FIELD OF THE INVENTION

This invention relates to the regeneration of amine used in the processing of natural gas. Specifically, the invention involves novel component configurations to increase ease of startup and operations for the amine regeneration system. Most particularly, the invention relates to an amine regeneration system which includes a process and associated system for direct injection of gas into the flash tank to allow immediate setting of the pressure regulation valve.

BACKGROUND OF THE INVENTION

Acid gas removal from gas streams, particularly removal of hydrogen sulfide and carbon dioxide from gas streams formed in refinery process units, synthesis gas production plants and oil and gas production facilities, is necessary to allow this gas to be used and/or sold into pipeline systems. The removal of sulfur compounds from these acid gasses or "sour gasses" is called "sweetening." Typically, acid gases are removed using an amine-based solvent to absorb the acid gas via various chemical reactions, resulting in the production of a rich amine solvent, which can then be regenerated using heat.

Hydrogen sulfide is a toxic gas that must generally be removed to extreme low concentrations (less than 0.25 grains of $H_2S$ per 100 standard cubic feet) prior to pipeline delivery. When mixed with free water it forms a weak acid that can cause corrosion.

Carbon dioxide is a non-toxic inert gas. Carbon dioxide, as such, is harmless in dry natural gas but when mixed with free water will form a weak acid and also cause corrosion. Inlet gas to cryogenic plants that contain concentrations of $CO_2$ in excess of 0.75 to 1.0 percent $CO_2$ may cause freezing problems. The $CO_2$ will freeze to a solid ice in a turbo expander plant demethanizer where it may plug lines and even plug the tower itself. Often flooding of the demethanizer results from carbon dioxide freezing within the tower. When the plant inlet gas contains concentrations of carbon dioxide too high to process, all of the gas may be treated or part of the gas may be separated into a side stream and treated by an amine plant. Principally all the carbon dioxide is removed in the amine plant. When the side stream is processed, and sufficient gas is treated, it is blended back with the untreated gas, thus yielding a carbon dioxide content of the blended stream which is low enough for processing. Carbon dioxide also lowers the heating value of the gas stream which is usually specified as 1000 BTU/scf.

There are generally two types of gas treating processes: (a) absorption and (b) adsorption. In absorption processes, the gas stream contacts a liquid that selectively removes acid gases. The most common absorption process is the amine process. The liquid absorbent is a mixture of water and a chemical amine, usually monoethanol-amine (MEA) or diethanolamine (DEA). Sometimes triethanol-amine (TEA), diglycolamine (DGA), and methyl-diethanolamine (MDEA), diisopropylamine, sulfanol and solutions of these, with special additives to improve efficiencies, are utilized.

Amines remove carbon dioxide and hydrogen sulfide by a chemical reaction that changes the chemical form of both the amine and the acid gases. The new chemical changes the acid gases to a liquid form which is separated from the acid-free gas or sweetened gas. The chemical reaction between amine (called lean amine at the start of the process) and acid gases gives off heat when the reaction takes place. The sweet residue gas flows out the top of a contactor or absorber and the reacted amine (also called rich amine) flows out the bottom and is generally higher in temperature than the inlets. Lean amine is regenerated by reducing the pressure and adding heat to the rich amine.

The "Fifth Edition Gas Purification" by Arthur Kohl and Richard Nielsen (Gulf Publishing, 1960 to 1997) illustrates various processes for the purification of gases utilizing amine solvents and illustrates processes for regeneration of the amine solvents. Particularly preferred amine-based solvents include secondary and tertiary amines (e.g., diethanolamine [DEA], and/or methyldiethanolamine [MDEA]), which are generally more energy efficient than primary amines due to their lower heat of reaction and lower energy requirements for regeneration. Alternative amine solvents may further include monoethanolamine [MEA], diglycolamine [DGA], triethanolamine [TEA], diisopropylamine, and various combinations thereof, along with one or more additives.

The effectiveness of a particular amine solvent to absorb acid gases to meet the treated gas specification typically depends on the residual acid gas content in the lean amine, which in turn is a function of the particular regeneration method and conditions. The lower the acid gas content in the lean amine, the more effective the acid gas absorption process. Therefore, a variety of approaches have been undertaken to improve the current acid gas absorption and regeneration processes.

While numerous prior art processes and systems for acid gas absorption and solvent regeneration are known in the art, many suffer from one or more disadvantages or inefficiencies.

DESCRIPTION OF THE PRIOR ART

U.S. Pat. No. 4,152,217 to Eisenberg et al. teaches an amine regeneration system which utilizes a split rich amine stream wherein one stream is routed directly to the top of an amine regenerator column and the second stream is routed to a heat exchanger where it is heated en route to an intermediate point of the regenerator column. The spent amine stream which is passed without prior heating directly to the top of the regenerator column is heated by condensing steam in the column which would normally escape therefrom, thereby reducing the amount of "saturation" steam which is lost from the system, thereby reducing the overall energy requirements for the system.

U.S. Pat. No. 4,461,749 to Thorn is directed to a method of processing acid gases wherein makeup water is distilled internally in an amine gas treating unit by adding it to the reclaimer used to process a slipstream of lean amine from the stripper.

U.S. Pat. No. 4,798,910 to Herrin teaches a method for amine regeneration wherein a rich amine out of a first heat exchanger is temperature controlled prior to transfer to a second heat exchanger. At least a portion of the hot overhead gasses exiting from a stripping still are transferred to the second heat exchanger. Temperature controlled heated rich amine liquid passes through the second exchanger and contacts the hot overhead gasses. The rich amine liquid is increased in higher temperature thereby and then is transferred to yet a third exchanger and finally to the stripping still for regeneration of lean amine. The reduced temperature overhead gasses are transferred to the reflux condenser for final cooling.

U.S. Pat. No. 6,071,484 to Dingman, et al. describe a method to produce an ultra lean amine using an ion exchange bed to remove the residual acid gases in the lean amine.

U.S. Pat. No. 4,798,910 to Herrin, teaches the use of an additional heat exchanger to heat the rich amine solvent using a portion of the heat content in the regenerator overhead gases. This method reduces overhead condenser duty to some degree, however reboiler duty remains largely unaffected, as the amine regeneration process is more strongly dependent on the stripping steam supplied at the bottom of the regenerator.

U.S. Pat. No. 3,565,573 to Thirkell teaches a process in which acid gas is treated in a dual-zone absorber to provide a rich solvent that is regenerated in conventional manner.

U.S. Pat. No. 3,829,521 to Green et al., similarly describe a configuration in which a pre-stripper and a stripper operate in series to remove acid gas from two gas streams.

These references fail to address the start-up problems and process inefficiencies of amine regeneration plants which are the subject of the instant invention. The improved configurations and methods for solvent regeneration disclosed herein therefore solve a long-felt need in the art.

SUMMARY OF THE INVENTION

In order for natural gas, which is useful in such varied applications as home heating and cooking, industrial heating, and the generation of electricity, to be utilized, hydrogen sulfide ($H_2S$), carbon dioxide ($CO_2$), and water vapor must be removed.

Amine plants are typically employed for the removal of the first two contaminants listed (hereto referred to as "acid gas"). In an amine plant, an amine based solvent is brought in contact with the natural gas stream. The amine adsorbs the acid gas and then the amine is regenerated, which means that the acid gas in the amine is removed so the amine can be reused.

This patent is directed toward improvements in the amine regeneration process. The method for regeneration utilizes a reboiler to create steam that comes into contact with the amine. The steam has two purposes: to provide heat that allows the endothermic de-adsorption of the acid gas to occur and to reduce the partial pressure of the acid gas in the vessel. This reduction in partial pressure allows the amine to be regenerated at much higher purities than would otherwise be possible. The amine is then cooled and reused to treat the natural gas.

In accordance with the present invention, an improved process for amine regeneration is provided via a system including a flash tank, a rich/lean heat exchanger, a still, a reflux condenser, a reflux accumulator, a pump, a reboiler, a flash tank pressurization line, and a valve, thereby enabling an operator to directly inject gas into the flash tank thereby permitting immediate setting of the pressure regulation valve. This reduces down time and provides for more economical plant operation.

Accordingly, it is a primary objective of the instant invention to allow the direct injection of gas into the flash tank to allow immediate setting of the pressure regulation valve It is a further objective of the instant invention to reduce the operations cost due to waiting for the gas pressure to increase in the flash tank;

It is yet another objective of the instant invention to reduce downtime by not waiting for the gas pressure to increase in the flash tank.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 2 is a flow diagram of a prior art process absent the flash tank pressurization components of the present invention.

DETAILED DESCRIPTION OF THE INVENTION

Figure 1:
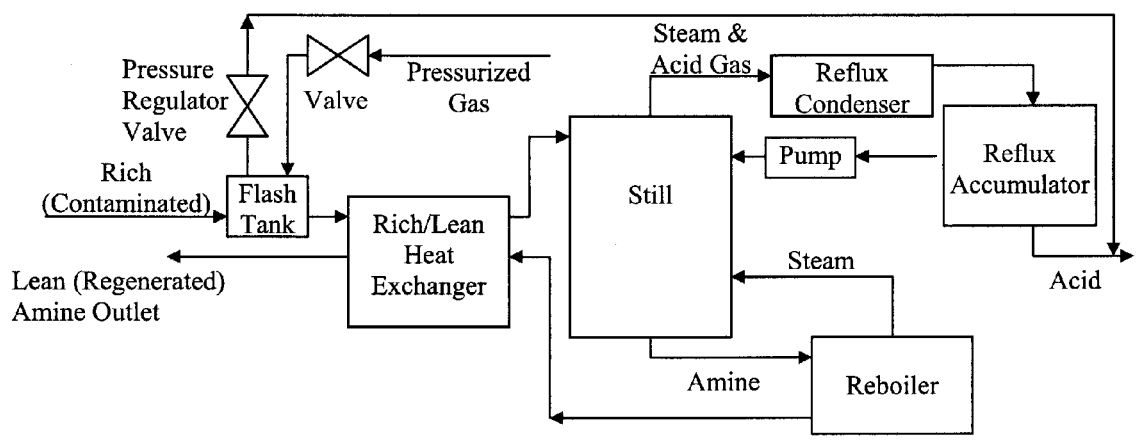
FIG. 1 shows the flow of contaminated amine through its separation into clean amine and acid gas.

A preferred method for optimizing start-up of an amine regeneration system is set forth in FIG. 1. This method includes the steps of:

(a) passing a rich amine input stream through a flash tank wherein a pressure differential enables flashing off of a portion of acid gas from the rich amine input stream, whereby dynamic pressure control of the flash tank is achieved by providing a controlled source of supplemental acid gas to the flash tank;

(b) heating the input rich amine stream by passage thereof through a rich/lean heat exchanger to form a heated rich amine stream;

(c) releasing acid gas components from the heated rich amine stream by passage of the heated rich amine stream into a still wherein the heated rich amine stream is subjected to an initial steam contact thereby causing it to release acid gas components and form a lean amine stream;

(d) feeding the resultant lean amine stream to a reboiler where it is heated to produce additional steam;

(e) introducing the additional steam to the still whereby it contacts the heated rich amine stream and exits the still as an overhead admixture including the acid gas components;

(f) recovering water from the overhead stream by passage thereof through a reflux condenser whereby acid gas components exit to waste;

(g) storing the recovered water in a reflux accumulator for subsequent pumping to the still; and (h) passing the lean amine stream from the reboiler to the rich/lean heat exchanger wherein it is cooled and exits the system fully regenerated.

A flash tank pressurization assembly comprised of a pressurized acid gas line and associated valving, allows acid gas to be introduced to the flash tank to set the pressure regulation valve which allows acid gas to "flash" out of the amine solution. This pressure cannot be set until enough gas has been released from the amine. The inclusion of this line allows gas to be directly fed into the flash tank without waiting. This reduces startup time and operator effort.

Advantages

From the description above, a number of advantages of the amine regeneration facility become evident:

(a) the cost of operations due to waiting for the accumulation of acid gas in the flash tank to set the pressure regulation valve is reduced by allowing the operator to set the pressure in a few minutes rather than a few hours;

(b) the amount of downtime is reduced by not waiting on the accumulation of gas in the flash tank to set the pressure;

(c) the amount of downtime is reduced by not having to wait for the plant to reach a "steady state of operation."

Operation—FIG. 1

The contaminated amine is introduced the flash tank allowing some of the acid gas components to flash off. The amine is then introduced into the rich/lean heat exchanger causing the rich amine to be heated. The rich amine is then introduced into the still where it comes in contact with steam as it goes down through the still. The amine releases the acid gas components which exit the still with the steam and they are carried into the reflux condenser. The steam condenses in the reflux condenser, and then the water stream enters the reflux accumulator where the acid gas exits the system. The condensed water is stored in the reflux accumulator until it is pumped back into the still. The amine exits the still and enters the reboiler where it is heated to release steam which is fed into the still. The fully regenerated amine is passed into the rich/lean heat exchanger where it is cooled and exits the system as fully regenerated amine. The flash tank pressurization line allows the flash tank pressure to be set at any time including startup and after plant upset.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method for optimizing operation of an amine regeneration system comprising:

(a) passing a rich amine input stream through a flash tank wherein a pressure differential enables flashing off of a portion of acid gas from said rich amine input stream, whereby dynamic pressure control of said flash tank is achieved by providing a controlled source for direct injection of a supplemental pressurized acid gas stream to said flash tank;

(b) heating said input rich amine stream by passage thereof through a rich/lean heat exchanger to form a heated rich amine stream;

(c) releasing acid gas components from said heated rich amine stream by passage of said heated rich amine stream into a still wherein said heated rich amine stream is subjected to an initial steam contact thereby causing it to release acid gas components and form a lean amine stream;

(d) feeding said resultant lean amine stream to a reboiler where it is heated to produce additional steam;

(e) introducing said additional steam to said still whereby it contacts said heated rich amine stream and exits said still as an overhead admixture including said acid gas components;

(f) recovering water from said overhead admixture by passage thereof through a reflux condenser whereby acid gas components exit to waste;

(g) storing said recovered water in a reflux accumulator for subsequent pumping to said still; and (h) passing said lean amine stream from said reboiler to said rich/lean heat exchanger wherein it is cooled and exits said system fully regenerated.

2. An optimized amine regeneration system comprising:

(a) a flash tank pressurization assembly, in fluid communication with a source of purified and pressurized acid gas and further in fluid communication with a flash tank for direct injection of a supplemental pressurized acid gas stream to said flash tank, said flash tank being constructed and arranged to flash off a portion of acid gas contained within an input rich amine stream, whereby a particular pressure level within said flash tank is achieved by supplementation with said pressurized acid gas;

(b) a rich/lean heat exchanger for heating said input rich amine stream to form a heated rich amine stream;

(c) a still wherein said heated rich amine stream is subjected to an initial steam contact thereby causing it to release acid gas components and form a lean amine stream;

(d) a reboiler for heating said lean amine stream to produce additional steam;

(e) a line for introducing said additional steam to said still whereby it contacts said heated rich amine stream and exits said still as an overhead admixture including said acid gas components;

(f) a reflux condenser for recovering water from said overhead admixture for storage and separation of said acid gas components to waste;

(g) a reflux accumulator for storing said recovered water and subsequently pumping to said still; and (h) a line for passing said lean amine stream from said reboiler to said rich/lean heat exchanger wherein it is cooled and exits said system fully regenerated.

* * * * *